(12) United States Patent
Patel

(10) Patent No.: US 9,475,891 B2
(45) Date of Patent: Oct. 25, 2016

(54) PROCESS FOR THE PREPARATION OF COLESEVELAM HYDROCHLORIDE

(71) Applicant: Mahendra R. Patel, Milltown, NJ (US)

(72) Inventor: Mahendra R. Patel, Milltown, NJ (US)

(73) Assignee: Navinta, LLC, Ewing, NJ (US)

( * ) Notice: Subject to any disclaimer, the term of this patent is extended or adjusted under 35 U.S.C. 154(b) by 64 days.

(21) Appl. No.: 14/490,415

(22) Filed: Sep. 18, 2014

(65) Prior Publication Data

US 2015/0080532 A1     Mar. 19, 2015

Related U.S. Application Data

(60) Provisional application No. 61/879,904, filed on Sep. 19, 2013.

(51) Int. Cl.
*C08F 8/02* (2006.01)
*C08F 226/02* (2006.01)
*A61K 31/785* (2006.01)

(52) U.S. Cl.
CPC ........................................ *C08F 8/02* (2013.01)

(58) Field of Classification Search
CPC ........... C08F 8/02; C08F 226/02; C08J 3/24; A61K 31/785
See application file for complete search history.

(56) References Cited

U.S. PATENT DOCUMENTS

| 5,607,669 | A | 3/1997 | Mandeville, III et al. |
| 5,624,963 | A | 4/1997 | Mandeville, III et al. |
| 5,679,717 | A | 10/1997 | Mandeville, III et al. |
| 5,693,675 | A | 12/1997 | Mandeville, III et al. |
| 5,917,007 | A | 6/1999 | Mandeville, III et al. |
| 5,919,832 | A | 7/1999 | Mandeville, III et al. |
| 6,066,678 | A | 5/2000 | Mandeville, III et al. |
| 6,433,026 | B2 | 8/2002 | Mandeville, III et al. |
| 6,784,254 | B2 | 8/2004 | Mandeville, III et al. |
| 7,105,631 | B2 | 9/2006 | Stanek et al. |
| 7,148,319 | B2 | 12/2006 | Stanek et al. |
| 7,261,880 | B2 * | 8/2007 | Burke .................. A61K 31/015 424/78.31 |
| 8,404,784 | B2 | 3/2013 | Jobdevairakkam et al. |
| 8,710,154 | B2 | 4/2014 | Govindarajan et al. |

FOREIGN PATENT DOCUMENTS

| WO | 2010029579 A2 | 3/2010 |
| WO | 2010041268 A2 | 4/2010 |
| WO | WO 2011/154977 A1 * | 12/2011 |

* cited by examiner

*Primary Examiner* — Fred M Teskin
(74) *Attorney, Agent, or Firm* — St. Onge Steward Johnston and Reens, LLC

(57) ABSTRACT

A novel process of manufacturing colesevelam hydrochloride including the steps of alkylating polyallylamine with n-decylbromide and 6-bromohexyl trimethyl ammonium bromide, followed by cross-linking the alkylated polyallylamine with epichlorohydrin in an aqueous medium, and adding a suitable chloride ion source to obtain colesevelam hydrochloride.

19 Claims, No Drawings

PROCESS FOR THE PREPARATION OF COLESEVELAM HYDROCHLORIDE

FIELD OF THE INVENTION

The present invention relates to processes for the preparation of colesevelam and pharmaceutically acceptable salts thereof.

BACKGROUND OF THE INVENTION

Colesevelam hydrochloride is a bile acid sequestrant with a high capacity for binding bile acids. It has been shown to reduce total and low-density lipoprotein cholesterol levels. Colesevelam hydrochloride has been approved by FDA and is sold under the brand name Welchol®, as the only medicine with a single active ingredient to lower both blood sugar and "bad" cholesterol (LDL-C) in adults with Type 2 diabetes and high cholesterol. Welchol® is administered orally.

Colesevelam hydrochloride is a modified cross-linked polyallylamine polymer containing polyallylamine base moiety having a $CH_2$—CHOH—$CH_2$ group between two amino groups, N-alkylated with a specific ratio of 6-trimethylammoniumhexyl group and decyl group. Colesevelam hydrochloride has almost all of its free amines protonated and contains about 21% chloride by weight.

All prior art requires that Colesevelam be manufactured by crosslinking polyallylamine hydrochloride (PAA-HCl) with epichlorohydrin to form sevelamer first, which is then alkylated with 1-bromodecane (a.k.a., n-decyl bromide) and 6-bromohexyl trimethylammonium bromide (6-BHTAB) in a reaction medium to form colesevelam. The chloride form of sevelamer has also been approved by FDA and is sold in the United States under the brand name Renagel®. Renagel® is indicated for the control of serum phosphorus in patients with chronic kidney disease on dialysis.

U.S. Pat. No. 5,693,675 was the first patent that discloses the preparation of colesevelam. The process consists of cross-linking polyallylamine hydrochloride with epichlorohydrin, followed by alkylating the resulting cross-linked polyallylamine with 6-bromohexyl trimethylammonium and 1-bromodecane. Colesevelam thus obtained is dried in a vacuum oven at 50° C. and milled to pass through an 80 mesh sieve. The patent does not disclose the preparation of colesevelam HCl.

In U.S. Pat. No. 5,607,669, cross-linked polyallylamine (sevelamer) is prepared in situ and presented in a gelled form. The alkylation is carried out on the gelled cross-linked polyallylamine with 6-bromohexyl trimethylammonium bromide and n-decyl bromide in presence of an aqueous base or a methanolic solution of a base. The resulting polymer (colesevelam) is washed several times with methanol, 2M sodium chloride solution in water, and deionized water. The patent does not provide information regarding the preparation of colesevelam HCl.

U.S. Pat. No. 7,105,631 discloses a preparation of colesevelam by cross-linking polyallylamine hydrochloride with epichlorohydrin to give a cross-linked polymer gel (sevelamer) which is cut into defined shape and washed with methanol. The obtained wet crude gel is then alkylated in methanol by adding one or/and more alkylators at 5-90° C. and under pressure of 1-3 bars in presence of a base followed by reprotonation using a concentrated hydrochloric acid to give a crude colesevelam hydrochloride. The crude colesevelam hydrochloride is washed several times with methanol, 2M sodium chloride solution in water to form colesevelam hydrochloride.

U.S. Pat. No. 7,148,319 discloses a process for the preparation of colesevelam by first deprotonating of a cross-linked polymer gel (sevelamer) with a base, followed by washing with water, an organic solvent or an organic solvent/water mixture, then alkylating with one or more alkylators to give a gel suspension (colesevelam). Later, the gel suspension is reprotonated by means of a concentrated hydrochloric acid to form colesevelam hydrochloride.

U.S. Pat. No. 8,710,154 (also published as WO 2010/029579) discloses a process for the preparation of colesevelam hydrochloride by neutralizing polyallylamine hydrochloride to polyallylamine followed by cross-linking with epichlorohydrin in a non aqueous medium to obtain a cross-linked polymer (sevelamer). The cross-linked polymer is then alkylated to give colesevelam.

PCT publication WO 2010/041268 discloses a process for the preparation of colesevelam hydrochloride by the alkylation of sevelamer hydrochloride using 6-bromohexyltrimethyl ammonium bromide and n-decyl bromide in the presence of a methanol solution of sodium hydroxide to give colesevelam in a wet form, which is then treated with a dilute hydrochloric acid to form colesevelam hydrochloride.

In addition to the above prior art references, colesevelam hydrochloride has also been described in U.S. Pat. Nos. 5,624,963, 5,679,717, 5,917,007, 5,919,832, and 8,404,784, which are incorporated by references.

Most of the prior art processes are limited to a lab or pilot plant scale. One reason is that cross-linked polyallylamine polymers are water swellable. Upon isolation from water, these polymers swell and occupy a large volume of about at least 5 times the volume of the dry material. This makes the manufacturing process that involves treating the cross-linked polyallylamine with water a difficult task because of the large volumes and the requirement of unusually large capacities of manufacturing equipments. Each step of treatment with water makes the process more complicated. In the prior art, an organic solvent is used as a medium for alkylating the swollen polymer. Yet it is still the operation is still cumbersome. Therefore, there exists a need in the industry to provide an efficient and industrially viable process for the preparation of colesevelam hydrochloride.

SUMMARY OF THE INVENTION

The present invention provides a novel process of making colesevelam and its pharmaceutically acceptable salts. Specifically, colesevelam is made by reacting pollyallylamine (PAA) with at least one alkylating agents (i.e., alkylators, such as n-decyl bromide and 6-bromohexyl trimethylammonium bromide, in a desired equivalence ratio) and then cross-linking of the polymer using epichlorohydrin. The process may further include a step of introducing a chloride ion source, such as hydrochloride to form colesevelam hydrochloride. Using the same manner, other pharmaceutically suitable salts can also be formed. Examples of pharmaceutically acceptable acid addition salts include inorganic acid addition salts, such as hydrobromide, hydriodate, phosphate, metaphosphate, nitrate and sulfate. and organic acid addition salts, such as tartrate, acetate, trifluoroacetate, citrate, oxalate, malate, lactate, fumarate, benzoate, maleate, fumarate, mandelate, glycollate, gluconate, succinate, methanesulfonate and aryl sulfonate, such as p-toluenesulfonate.

The addition of the two alkylating agents, prior to the cross-linking reaction, can be in any order. The two alklyating agents can be added simultaneously or one after the other. In the alternative, pollyallylamine is first alkylated with one of n-decyl bromide and 6-bromohexyl trimethylammonium bromide to obtain a partially alkylated polyallylamine followed by cross-linking using epichlorohydrin. The resulting partially alkylated and cross-linked polymer is further alkylated with the other alkylating agent (out of the unalkylated n-decyl bromide and 6-bromohexyl trimethylammonium bromide).

This novel sequence of first alkylation and then cross-linking the polymer in the preparation of colesevelam HCl advantageously improves the prior art process wherein the alkylation step is inconveniently conducted in a heterogeneous medium with a gelled polymer (sevelamer) and/or with an excess amount of organic solvent(s).

The novel process also generates a desired amine polymeric network that has an improved bile acid binding. The resulting colesevelam HCl is suitable for binding conjugated primary bile acids, such as cholic and chenodeoxycholic acids, after oral administration.

DETAILED DESCRIPTION OF THE INVENTION

In accordance with one embodiment, the process of making colesevelam hydrochloride comprises the steps of:
(a) optionally adjusting a polyallylamine solution to a desired pH range;
(b) alkylating the polyallylamine with 6-BHTAB and n-decyl bromide at a temperature range of 10° C. to 80° C.;
(c) crosslinking the resulting polymer using epichlorohydrin to yield colesevelam;
(d) isolating colesevelam from the reaction mixture;
(e) optionally, washing colesevelam using NaCl solution; and
(f) optionally, washing colesevelam with acetonitrile or combination of acetonitrile and organic solvent to remove the traces of 6-BHTAB and n-decyl bromide and to reduce the overall drying time;
(g) optionally, drying or using the wet colesevelam for next step;
(h) preparing colesevelam hydrochloride by adding a suitable chloride ion source to colesevelam, preferably the suitable chloride ion source is hydrochloric acid, and even more preferably the suitable chloride ion source is concentrated hydrochloric acid; and
(i) optionally, drying colesevelam hydrochloride and subjecting it to particle size reduction.

Solvents suitable for the reaction can be an organic solvent, water, a mixture of water and at least of one organic solvent, or a mixture of at least two organic solvents. Preferred solvents are water, acetonitrile, alcohols, toluene, ethyl acetate, or a mixture thereof. Even more preferred solvents are water and an aqueous solvent mixture. The aqueous solvent mixture refers to a mixture of water and at least one water miscible solvent, with water being the major component.

Polyallylamine hydrochloride is prepared by the process known in the art, such as by dissolving allylamine gas into hydrochloric acid and polymerizing using a radical initiator, 2,2'-azobis(2-methylpropionaimidine) dihydrochloride. The polyallylamine hydrochloride obtained by this process is isolated by filtration and washed with one or more water miscible solvents. The isolated polyallylamine hydrochloride is dried and tested for chloride content by argentometric titration. Polyallylamine hydrochloride salt is typically found to contain about 30 to 40% of chloride by weight. The molecular weight of polyallylamine hydrochloride, determined by HPLC using a gel permeation column, is about 2000 to 25000 daltons.

The concentration of polyallylamine can be in a range from about 20% to about 85%, preferably from about 30% to about 75%, and even more preferably from about 40% to about 65% by weight of polyallylamine and solvent(s).

In the alkylation step, the alkylation of polyallylamine with 6-BHTAB and n-decylbromidecan be in any order. For instance, the process can be preceded by alkylating 6-BHTAB first followed by alkylating 1-bromodecane, by alkylating first n-decylbromidefollowed by alkylating 6-BHTAB, or by adding both 6-BHTAB and n-decylbromide for simultaneous alkylation, prior to the next cross-linking reaction.

In accordance with another embodiment, the present invention provides a process wherein n-decylbromide n-decylbromide is reacted with polyallylmine first followed by crosslinking with epichlorohydrin, and the resulting crosslinked polymer is then reacted with 6-BHTAB to yield colesevelam.

In accordance with a further embodiment, the present invention provides a process wherein 6-BHTAB is reacted with polyallylmine first followed by crosslinking with epichlorohydrin, and the resulting crosslinked polymer is then reacted with n-decylbromide to make colesevelam.

The amount of 6-BHTAB and the amount of n-decylbromide used for the reaction in relative to the amount of polyallylmine determine the saturation of the alkylated polymer. They also determine the hydrophobic, hydrophilic and acidic/basic properties of the alkylated polymers. Moreover, they may also determine the maximum chloride content. For every 100 gm of polyallylamine, about 0.1 to about 3 times (by weight of polyallylamine), preferably about 0.3 to about 2 times (by weight of polyallylamine) of 1-bromodecane, even more preferably about 0.3 to about 1.25 times (by weight of polyallylamine) of 1-bromodecane, and about 0.2 to about 5 times (by weight of polyallylamine) of 6-BHTAB, preferably about 0.5 to about 2.5 times (by weight of polyallylamine) of 6-BHTAB, even more preferably about 0.5 to about 2 times (by weight of polyallylamine) of 6-BHTAB, are used.

Other suitable alkylating agents for the process of this type include, but are not limited to, 6-chlorohexyl trimethyl ammonium chloride, n-decylchloride, or other alkylating agents having a leaving group, such as epoxy, tosylate, mesylate or triflate, iodide, or fluoride, in lieu of chloride or bromide.

Epichlorohydrin has a low molecular weight and hydrophilic nature. It increases the water-swellability and gel properties of the polyallylamine. The amount of epichlorohydrin used for the reaction in relative to the amount of polyallylmine determines the level of crosslinking of the polymer. For 100 gm polyallylamine, about 1% to about 25% (by weight of polyallylamine), preferably about 2% to about 15% (by weight of polyallylamine), and more preferably about 2% to about 10% (by weight of polyallylamine) of epichlorohydrin is used.

Prior to or during the alkylation and cross-linking reactions, a base may be added to deprotonate PAA and/or adjust the pH of the reaction medium. Suitable bases may be a mixture of one or more bases selected from the group of sodium hydroxide, lithium hydroxide, potassium hydroxide, calcium hydroxide, ammonium hydroxide, sodium bicarbonate, sodium carbonate, potassium bicarbonate, potassium carbonate, ammonium carbonate, and ammonium bicarbonate.

Further, the preparation of colesevelam hydrochloride can be performed by:

(i) optionally, using a suspension of colesevelam or colesevelam with residual solvent(s), instead of using a dried colesevelam, to reduce drying cost;

(ii) forming colesevelam hydrochloride by adding a suitable chloride ion source, such as concentrated or diluted HCl solution, to colesevelam; and (iii) purifying colesevelam hydrochloride.

The concentration of chlorine ion in the final polymer can be controlled by adding a predetermined amount of hydrochloride in the salt forming reaction and by subsequent washes of colesevelam hydrochloride.

Other pharmaceutically acceptable salts can be formed in the similar manner by adding the corresponding acids to colesevelam. Examples of pharmaceutically acceptable salts include inorganic acid addition salts, such as hydrobromide, hydriodate, phosphate, metaphosphate, nitrate and sulfate, and organic acid addition salts, such as tartrate, acetate, trifluoroacetate, citrate, oxalate, malate, lactate, fumarate, benzoate, maleate, fumarate, mandelate, glycollate, gluconate, succinate, methanesulfonate and aryl sulfonate, such as p-toluenesulfonate.

The prepared colesevelam or colesevelam chloride is washed numerous times with solvents to remove unreacted reagents, byproducts, and salts that are formed during the process. Typically water or water based solutions are used to remove salts and organic solvents, organic solvents (such as methanol or acetonitrile) are used to remove unreacted reagents and byproducts, and sodium chloride aqueous solution is used to remove traces amount of water, organic solvents, and organic byproducts.

One distinctive feature of the present invention is that the cross-linking step is conducted at a later stage of the process, after the alkylating step. This is a greatly improvement over the prior art process. All prior art processes require alkylation of cross-linked PAA. But cross-linked PAA is in the form of a thick glassy gel. The gelled polymer is much less soluble than the non-crosslinked polymer. As described in the prior art, subsequently alkylating reactions with the gelled polymer, often need to run in a large quantity of an organic solvent or co-solvent, and/or as a suspension of the gelled polymer in a solvent or co-solvent. As such, the alkylation reactions are typically heterogeneous and are very cumbersome. At the end of the reaction, the large excess of solvent has to be removed or evaporated, which is not economical and not easy on an industrial scale.

Moreover, the prior art process often requires that the cross-linked polymer be isolated, broken and milled to small pieces by physical forces prior to the alkylation reaction in order to improve the alkylation reactivity. The alkylation reaction is typically conducted in an elevated temperature for an extended period of time, and sometimes with an added pressure. However, even with all those measures, alkylation with the gelled polymer may not easily reach completion. As such, it is very difficult to realize a stoichiometric reaction. Further, due to the additional steps of isolation, breaking and milling the gelled polymer to small pieces, change of reaction vessels between of each step is often necessary. Consequently, the reaction steps cannot be conveniently performed in situ within one vessel.

In contrast, the process in accordance with the present invention is designed to perform the alkylation reactions be performed prior to the crosslinking reaction. As such the alkylation reactions can be done in a liquid solution of PAA, at a lower temperature, at one atmosphere, wherein water can be a medium. Moreover, the entire reaction process may be done in one pot (i.e., without the need to change a reactor). Accordingly, the process is safer, more convenient and cost effective, and may be easily run on a larger scale than the prior art processes. It is noticed that even conducting one of the alkylation steps prior to the crosslinking step is a significant improvement over the prior art process.

The process in accordance with the present invention is suitable for the preparation of colesevelam hydrochloride on an industrial scale. This process is very simple and efficient because the PAA alkylation can be performed by using n-decyl bromide and 6-BHTAB, both dissolved in a solution of PAA. It does not require an excess solvent, a high agitation or a high reactor capacity. The process also reduces the cost and time needed for removing the solvent and drying the resulting colesevelam hydrochloride.

The order of adding the alkylating agents and crosslinking agent not only has an impact on the process itself, but also has an impact on the properties of the resulting polymer. The colesevelam hydrochloride prepared in accordance with the present invention preferably has at least one of the following properties: bile acid binding from about 2.0 to about 2.5, and chloride content between about 16% to about 25%. In some embodiments, the particle size of the colesevelam hydrochloride is less than 100 micron. The bile acid binding property may be measured by using the method known in the art, such as those disclosed in U.S. Pat. No. 5,607,669, which is herein incorporated by reference.

Other factors may affect the bile acid binding properties, which include, but are not limited to, the relative ratio of and order of adding the alkylating and crosslinking agents, the accessibility of the amine and trimethylamine of the polyallylamine chain, the particle size of colesevelam, the extent of water wash of colesevelam (measured by the control of the conductivity of mother liquor), and the type and percentage of counter ion of colesevelam.

The colesevelam hydrochloride prepared in accordance with the present invention has an improved bile acid binding properties. Without wishing to be bound by theory, it is believed that the colesevelam hydrochloride prepared in accordance with the present invention provides more easily accessible sites on the colesevelam hydrochloride for binding with bile acid, and thus exhibit an improved bile acid binding.

Examples of suitable methods by which the alkylated cross-linked amino polymer, colesevelam hydrochloride, of the present invention can be formed are shown below:

Example 1

A polyallylamine solution (100 gm polyallylamine, 55% by weight in an aqueous solution) having a pH range between 7 to 12 was added to a round bottom flask (RBF) at 25° C. to 35° C. To the solution was added a 6-BHTAB solution (100.8 gm in 100 ml purified water) into the RBF at 25° C. to 35° C. Later was added n-decylbromide (85.4 gm) into the RBF at 25° C. to 35° C. The resulting solution was stirred at room temperature (RT) for at least 1 hour and then was added epichlorohydrin (6.3 gm) into the RBF at 25° C. to 35° C. Stirred the above reaction mixture for 30 minutes (min) at RT and then the reaction mixture was maintained at 60° C. to 65° C. for 4 hours (hrs). The resulting polymer gel was broken and milled followed by adding methanol (1,500 ml), stirring at 25-35° C. for 40 min, and filtering at the end of 40 min. A sodium chloride (175.5 gm) solution prepared by using purified water (1500 ml) was added to the wet material (i.e., polymer) obtained after filtration in a RBF and stir for 1 hr. The above mixture was filtered and to the wet material was charged purified water (1,000 ml) in a RBF. Then was added concentrated hydrochloric acid (37.8 gm) to the above reaction mixture and stir for additional 60 min at 25° C. to 35° C. and finally the solution was filtered. The wet material thus obtained was transferred to a RBF and was added purified water (1,500 ml) and stir for additional 1 hr. Conductivity of mother liquor was analyzed to ensure that it is no more than 1 mS/cm. If the conductivity does not comply with the desired conductivity specification, then the purified water washing step is repeated (until the conductivity meets the desired specification). The wet material was washed with water (1,000 ml per wash) once and methanol twice (200 ml per wash). Finally the wet material was filtered and dried at 40° C. to 70° C. in an air tray dryer for about 12 to 18 hrs until it met the desired specifications (i.e., loss on drying not more than 6%, and methanol content not more than 2000 ppm).

Example 2

A polyallylamine solution (100 gm polyallylamine, 55% by weight in an aqueous solution) having a pH range between 7 to 12 was charged to a Round Bottom Flask (RBF) at 25° C. to 35° C. and then was added epichlorohydrin (6.3 gm) into the RBF maintaining the temperature between 10° C. to 15° C. The above reaction mixture was then heated for 4 hrs at 45° C.-50° C. A thick glassy gel (i.e., cross-linked PAA) was obtained at the end of 4 hrs stirring. The gelled polymer was broken and milled. The solid gel thus obtained was charged to a RBF and washed by using purified water (1,500 ml) with stirring for 30-45 min followed by filtration at the end of 45 min. The resulting solid gel (i.e., the wet material) was washed with methanol (200 ml×2). The wet material was transferred in a RBF and was added methanol (2,000 ml) followed by adding a sodium hydroxide solution in methanol (29.4 gm NaOH in 350 ml methanol) to the reaction mixture and stirring for 15 min at 25° C. to 35° C. To the reaction mixture was added 6-BHTAB solution (100.8 gm 6-BHTAB into 300 ml methanol) at 25° C. to 35° C. and stirred for 15 min, then was added n-decylbromide (85.4 gm) into a RBF at 25° C. to 35° C. and stirred for additional 15 min. To the mixture, charged sodium hydroxide (7 gm) at 25° C. to 35° C. and stirred the reaction mass at 65° C. to 70° C. for 24 Hrs. Cooled the reaction mass to 25-35° C. gradually and filtered the solid reaction mass followed by two methanol wash (200 ml×2) to the wet material and two water washing (200×2 ml). Sodium chloride (117 g) solution in purified water (1,000 ml) was charged to the wet material and stir for 60 min followed by filtration. The wet solid was transferred to a RBF and was treated with 37.8 gm concentrated hydrochloric acid and stirred for 60 min followed by filtration. Again the wet material was transferred to a RBF and was added purified water (1,000 ml) and reaction mass was stir for 60 minutes followed by filtration. Conductivity of the mother liquor after each filtration was analyzed. If the conductivity is more than 1 mS/cm, then the purified water washing step is repeated (until the desired conductivity specification has been obtained). Additional water washes (200 ml×2) were given to the wet cake followed by methanol washes (200 ml×2) to the wet material. The wet material was filtered and dried at 60° C. to 65° C. until it met the desired specifications (i.e., loss on drying not more than 6%, and methanol content not more than 2,000 ppm). The solid material was micronized to a desired particle size.

Example 1 represents one embodiment of the present invention. Example 2 represents one of the prior art processes. It is apparent that Example 2 is more complicated in the procedure and requires a large quantity of an organic solvent (e.g., 2,350 ml of MeOH) during the alkylation reaction, a higher reaction temperature, and a longer reaction time. The process in accordance with Example 2 also necessarily requires the transfer of the reaction intermediates to different vessels for reactions and washes respectively.

The process of the present invention, as shown in Example 1, advantageously performs the alkylations and cross-linking reactions in one reactor (in situ reactions) using water as a medium. Because it does not require the use of a large quantity of an organic solvent during the reactions, the same size reactor that used by the prior art process is able to provide a larger capacity of production. Additionally, isolation and purification of the intermediates during the process is optional. Thus, the original PAA solution having a pH range between 7 to 12 substantially maintains to be basic, which is sufficient to enable both the alkylation and the cross-linking reaction without the need to add a fresh base.

In contrast, in the prior art process, a fresh base needs to be added to the reaction mixture to enable the alkylation reaction as a resulting of washing the polymer gel (i.e., the cross-linked PAA) with water and methanol after the cross-linking step. (See Example 2.) Washes of the polymer gel in Example 2 are necessary because the halogen-containing by-products, salts and any unreacted epichlorohydrin are embedded in the gel and may interfere with the subsequently alkylating reactions.

Accordingly, the process of the present invention is safer and cheaper, more environmentally friendly, and viable for production on an industrial scale.

The present invention is not limited by the above illustrative embodiments or examples. Modifications can be made without departing from the scope or spirit of the invention.

What is claimed is:

1. A process for the preparation of colesevelam and/or pharmaceutically acceptable salts thereof comprising:
    (a) reacting a polyallylamine solution with two alkylating agents to form an alkylated polyallylamine; and
    (b) crosslinking the alkylated polyallylamine from step (a) with epichlorohydrin to form colesevelam,
    wherein one of the two alkylating agents is selected from a group consisting of n-decyl bromide, n-decyl chloride, n-decyl tosylate, n-decyl mesylate, n-decyl triflate, n-decyl iodide, n-decyl fluoride, and a combination thereof; and
    wherein the other of the two alkylating agents is selected from a group consisting of 6-bromohexyl trimethyl ammonium bromide, 6-chlorohexyl trimethyl ammonium chloride, and a combination thereof;
    wherein the alkylation step (a) and the crosslinking step (b) are conducted in water or an aqueous solvent mixture.

2. A process for the preparation of colesevelam and/or pharmaceutically acceptable salts thereof comprising:
    (a) reacting a polyallylamine solution with two alkylating agents to form an alkylated polyallylamine; and
    (b) crosslinking the alkylated polyallylamine from step (a) with epichlorohydrin to form colesevelam,
    wherein one of the two alkylating agents is selected from a group consisting of n-decyl bromide, n-decyl chloride, n-decyl tosylate, n-decyl mesylate, n-decyl triflate, n-decyl iodide, n-decyl fluoride, and a combination thereof; and wherein the other of the two alkylating agents is selected from a group consisting of 6-bromohexyl trimethyl ammonium bromide, 6-chlorohexyl trimethyl ammonium chloride, and a combination thereof, wherein the alkylation step (a) and the crosslinking step (b) are conducted in the same reactor without isolation of the alkylated polyallylamine prior to step (b).

3. The process according to claim 2, further comprising a step of adding a base to the polyallyamine solution prior to step (a) such that the pH of the polyallylamine solution is in the range of 7-12.

4. The process according to claim 2, wherein one of the two alkylating agents is n-decyl bromide and the other of the two alkylating agents is 6-bromohexyl trimethyl ammonium bromide, and wherein the ratio polyallylamine to n-decyl bromide is about 1:0.1 to about 1:3 by weight, and the ratio of polyallylamine to 6-bromohexyl trimethyl ammonium bromide is about 1:0.2 to about 1:5 by weight.

5. The process according to claim 2, wherein the ratio of polyallylamine to epichlorohydrin is about 1:0.01 to about 1:0.25 by weight.

6. The process according to claim 2, further comprising a step of adding an ion source to form a pharmaceutically acceptable salt of colesevelam.

7. The process according to claim 6, wherein the ion source is a chloride ion source.

8. The process according to claim 7, wherein the ion source is concentrated hydrochloric acid.

9. The process according to claim 2, further comprising a step of washing the colesevelam and/or the pharmaceutically acceptable salts thereof with an organic solvent, a sodium chloride, and water, in any order.

10. The process according to claim 9, wherein the organic solvent is methanol.

11. The process according to claim 10, further comprising a step of measuring conductivity of a mother liquid from the water wash, wherein the water wash is repeated until the conductivity of the mother liquor from the wash is no more than 1 mS/cm.

12. The process according to claim 2, further comprising a step of drying the colesevelam and/or the pharmaceutically acceptable salts thereof.

13. The process according to claim 2, further comprising a step of reducing particle sizes of the colesevelam and/or the pharmaceutically acceptable salts thereof.

14. A process for the preparation of colesevelam and pharmaceutically acceptable salts thereof comprising:
 (a) reacting a polyallylamine solution with one of two alkylating agents to form a first alkylated polyallylamine;
 (b) crosslinking the alkylated polyallylamine from step (a) by using epichlorohydrin to form a cross-linked alkylated polyallylamine; and
 (c) reacting the cross-linked alkylated polyallylamine with the other of the two alkylating agents to form colesevelam;
 wherein the two alkylating agents are selected from a group consisting of n-decyl bromide, n-decyl chloride, n-decyl tosylate, n-decyl mesylate, n-decyl triflate, n-decyl iodide, n-decyl fluoride, and a combination thereof, and selected from a group consisting of 6-bromohexyl trimethyl ammonium bromide, 6-chlorohexyl trimethyl ammonium chloride, and a combination thereof.

15. The process according to claim 14, wherein the alkylation steps (a) and (c) and the crosslinking step (b) are conducted in water or an aqueous solvent mixture.

16. The process according to claim 14, wherein the steps (a) to (c) are conducted in the same reactor without isolation of the alkylated polyallylamine or the cross-linked alkylated polyallylamine prior to the next step.

17. The process according to claim 14, further comprising the step of adjusting a chloride ion of the colesevelam with a suitable chloride ion source.

18. The process according to claim 14, further comprising a step of adding an ion source to form a pharmaceutically acceptable salt of colesevelam.

19. The process according to claim 18, wherein the ion source is a chloride ion source.

\* \* \* \* \*